Patented Mar. 15, 1927.

1,620,899

UNITED STATES PATENT OFFICE.

LESTER KIRSCHBRAUN, OF CHICAGO, ILLINOIS.

BITUMINOUS COMPOSITION AND PROCESS OF MAKING SAME.

No Drawing.   Application filed April 23, 1921.   Serial No. 463,945.

This invention relates to improvements in bituminous compositions and process of making same.

I have discovered that certain kinds of bitumens or pitches emulsify more readily with certain kinds of colloidal clay. As a matter of fact, there are a wide variety of clays, different clays having different colloidal properties, which differences substantially affect the character of the emulsion itself. For example, in some clays that are not of highly colloidal nature, the proportion of such clay necessary to affect any sort of emulsion is extremely high in relation to the amount of dispersed asphalt; in addition to which these clays of relatively low colloidality cause the dispersion of the asphalt or bituminous material to be relatively coarse, so that, as a matter of fact, such combinations of asphalt with clays of the character referred to partake more of the nature of suspensions rather than true emulsions. As a result, a substantial portion of the product of such dispersion contains actually asphalt in rather a comminuted form rather than in that degree of non-adhesive fineness characteristic of non-adhesive emulsions. With such clays, the proportion of bitumen which may be emulsified is, as stated, relatively small so that approximately equal parts of asphalt to clay or even one-half of the amount of asphalt relative to clay represents the amount which may be used up to the point of refusal of the clay to disperse more asphalt. Such emulsions are not satisfactory for operation on a paper machine and in commercial operation, it has been found necessary to secure a clay which is capable of dispersing the asphalt in substantially larger proportions than those stated and to such a degree of fineness that practically all of the particles will pass a screen having 40,000 openings per square inch or finer.

I have discovered that certain kinds of clay, hereinafter described are particularly adapted for carrying out my invention and more specially with pitches or bitumens which are in themselves difficult to emulsify. The particular clay referred to in the present invention is one which appears to be of high colloidality, and while showing by its chemical analysis, the constituents of ordinary clays, nevertheless, its physical structure is of such a different character as to exhibit unusual properties of a highly desirable character for producing bituminous non-adhesive emulsions.

A commercial variety of this particular clay is found on the market and is known as "wilkinite" which is the trade name for a particular mineral known as bentonite. Commercial deposits are being mined at the present time in Wyoming, California and Utah. While this is considered in this connection as clay, it is by some treated as a distinct mineral species. It may be differentiated from colloidal clays which I have heretofore used by its extreme sliminess when wet, the large amount of water required to induce plasticity and its great viscosity when suspended in water. In this respect it may be readily differentiated from other clays which affect but slightly the viscosity of their water suspension. I have noted that, whereas the viscosity characteristics of ordinary colloidal clay as tested by the Engler viscosimeter vary but slightly with the percentage of clay present in the water; that with the clay of the character referred to, there is a marked change in the viscosity so that, beginning with a 2% suspension of this clay, the Engler viscosity increases very rapidly until approximately 7% suspension is so thick and so jelly-like as to scarcely flow through the aperture of a standard Engler viscosimeter.

When an emulsion is made with clay of this character, it exhibits certain desirable characteristics. In the first place, by using this clay, it is possible to decrease the amount of emulsifying agent very materially. Where, in the commercial operation of this process, a clay has been used which will emulsify approximately five times its weight of asphalt, the clay of the present invention will readily emulsify fifteen to thirty times its weight of asphalt. Of course, it is obvious that various proportions other than those stated may be employed. Another striking characteristic resides in the fact that the degree of dispersion of the bitumen attained with this clay appears to be substantially finer than with usual clays and the nature of the dispersed bitumen particle strikingly different. Microscopic examination of the usual emulsion where asphalt of say, 150 degrees F., melting point is used, shows the dispersed bitumen particles to be ovoid in shape, whereas the dispersion with the described clay used, produces particles which are frequently spherical and very much finer than the emulsion of the kind referred to. This clay is also capable of readily emulsifying those bitumens which are more refractory to emulsification with clay of less colloidality. Such pitches as stearine, coal tar pitches, various animal and vegetable pitches, air blown asphalts of relatively high melting point, can be emulsified in rather lesser proportions with the usual colloidal clay but by using the clay of the present invention as an emulsifying agent, such pitches are dispersed very readily and in very large proportion relative to the amount of emulsifying agent. It is a peculiar characteristic of such emulsions, as for example, stearine pitch, that the degree of dispersion is so fine as to produce an emulsion which has the color possessed by the pitch when in very thin films. In other words, the emulsion instead of being black, is brown or amber. Likewise, bituminous mixtures containing gilsonite are dispersed with a degree of fineness which impart to them similar color characteristics so that the emulsion, instead of being black, is in this case, brown.

It is apparent that a non-adhesive emulsion of the character referred to and carrying such a small amount of emulsifying agent possesses many advantageous features. For example, in making paper in which such emulsion is introduced with the stock, it is apparent that a substantially less inert material is carried into the stock and is present during the felting operation. This results in a stronger and smoother sheet. It also causes the asphalt to be carried more readily on account of the apparently lighter specific gravity of the dispersed asphalt particles with their adsorbed clay. The bentonite like material causes the emulsion to be held more readily in suspension which facilitates its being carried into the fibres.

A further characteristic of the emulsion produced with this material described, resides in the fact that it is particularly susceptible to the use of a flocculating agent so that when such a material as aluminum sulphate is added to the emulsion, bulky and heavy flocs are produced which act as a protective coating about the particles of dispersed asphalt, causing the protective element to remain with the asphalt upon extreme dilution with water and upon being subjected to the pressures and contacts with wires and blankets of the paper machine.

The emulsion produced by this agent is noticeably different than that produced by ordinary colloidal clay on its superficial appearance in that it possesses a smooth jelly-like character and the particles when viewed under a microscope frequently appear round and very much finer, showing numerous particles with Brownian movement.

Waterproof paper may be made by this emulsifying agent in the same way as that described in previous applications filed by me above referred to, the non-adhesive emulsion being made, using emulsifying agent of the character above described, the bitumen or pitch forming the internal phase of the emulsion. This is then mixed with the fibrous pulp and passed over the paper forming machinery in the usual way. The water evaporates as the felted sheet passes over the dryers of the paper machine, whereupon the bitumen coalesces and unites with the felted fibre. By the term "bitumen" or "bituminous" as employed in the claims, I intend to include those types of materials above specifically related. By the use of the term "bentonite" in my claims, I intend to embrace any materials which possess substantially the characteristics herein stated.

I claim as my invention:

1. An emulsion comprising bitumen in the internal phase, and water and bentonite in the external phase.

2. An emulsion comprising bitumen forming the internal phase, and water and bentonite forming the external phase, said emulsion being characterized by ability to remain in suspension.

3. An aqueous bituminous emulsion, comprising bentonite as the dispersing agent.

4. An aqueous bituminous emulsion comprising bentonite as the dispersing agent in the proportions of substantially above five parts by weight of bitumen to one part by weight of bentonite.

5. A non-adhesive bituminous emulsion, comprising bitumen, an aqueous vehicle and bentonite, the bitumen forming the internal phase and the aqueous vehicle the external phase, the amount of bitumen present being substantially above five times by weight of that of the bentonite.

6. A bituminous emulsion comprising bitumen, an aqueous vehicle and bentonite, the bitumen forming the internal phase, and the aqueous vehicle the external phase, there being present a quantity of bitumen at least ten times greater by weight than the bentonite.

7. A bituminous emulsion comprising bitumen, an aqueous vehicle and bentonite, the bitumen forming the internal phase and the aqueous medium the external phase, the proportions of the bitumen relative to the bentonite being substantially fifteen to thirty times greater by weight than the bentonite.

8. A process of making a bituminous emulsion comprising the steps of forming an aqueous mixture of bentonite and water, dispersing bitumen in said mixture, the bitumen constituting the internal phase and the aqueous medium the external phase, the amount of bitumen added being substantially above five times greater by weight relative to the bentonite.

9. A process of making a bituminous emulsion which comprises the steps of forming an aqueous mixture of bentonite and water, dispersing bitumen in said aqueous mixture, the bitumen constituting the internal phase and the bentonite the external phase, the amount of bitumen added ranging from fifteen to thirty times by weight to one part by weight of the bentonite.

10. A process of making a bituminous emulsion which comprises the steps of forming an aqueous mixture of bentonite and water, dispersing bitumen in said aqueous mixture, the bitumen constituting the internal phase and the bentonite the external phase, the amount of bitumen added being substantially thirty times by weight to one part by weight of the bentonite.

11. A process of forming a bituminous emulsion comprising agitating a bitumen with a fluid aqueous suspension of a clay-like colloid, the colloid being characterized by its ability to produce a suspension having a viscosity substantially higher than water when in concentrations from two to seven percent.

12. A process of forming a bituminous emulsion, consisting in dispersing bitumen in an aqueous medium containing bentonite, the bentonite being characterized by its ability to produce a suspension having a viscosity substantially higher than water when in concentration of less than seven percent.

13. A process of forming a bituminous emulsion, consisting in dispersing bitumen in an aqueous medium containing bentonite, the bentonite being characterized by its ability to produce a suspension having a viscosity higher than water when in concentrations of substantially two percent.

14. An aqueous bituminous emulsion, comprising bentonite as the dispersing agent and a normally non-fluid bitumen.

15. A stable bituminous emulsion comprising normally non-fluid bitumen, an aqueous vehicle and bentonite, the bentonite being characterized by its capability to produce a suspension having a viscosity substantially higher than water when in concentration of less than seven percent.

LESTER KIRSCHBRAUN.